（12） United States Patent
Sakakima

(10) Patent No.: US 11,818,323 B2
(45) Date of Patent: Nov. 14, 2023

(54) IMAGE GENERATION SYSTEM, METHOD FOR GENERATING A VIRTUAL VIEWPOINT IMAGE, AND STORAGE MEDIUM

(71) Applicant: CANON KABUSHIKI KAISHA, Tokyo (JP)

(72) Inventor: Eito Sakakima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 457 days.

(21) Appl. No.: 17/186,738

(22) Filed: Feb. 26, 2021

(65) Prior Publication Data
US 2021/0281812 A1    Sep. 9, 2021

(30) Foreign Application Priority Data
Mar. 5, 2020   (JP) ................................. 2020-037639

(51) Int. Cl.
  *H04N 13/117*   (2018.01)
  *H04N 13/279*   (2018.01)
(52) U.S. Cl.
  CPC ......... *H04N 13/117* (2018.05); *H04N 13/279* (2018.05)
(58) Field of Classification Search
  None
  See application file for complete search history.

(56) References Cited

U.S. PATENT DOCUMENTS

| 10,742,951 | B2  |   | 8/2020 | Sakakima |       |
|------------|-----|---|--------|----------|-------|
| 2018/0204381 | A1 | * | 7/2018 | Kanatsu .................. | G06T 7/248 |
| 2021/0133944 | A1 |   | 5/2021 | Sakakima |       |

FOREIGN PATENT DOCUMENTS

JP     2014-215828 A    11/2014

* cited by examiner

*Primary Examiner* — Mark T Monk
(74) *Attorney, Agent, or Firm* — Carter, DeLuca & Farrell LLP

(57) ABSTRACT

An object is to efficiently generate virtual viewpoint images in different image formats. The image generation system includes a plurality of rendering modules. Then, virtual viewpoint information indicating a virtual viewpoint, for generating a virtual viewpoint image adapted to a predetermined image format, is converted into a plurality of pieces of virtual viewpoint information which indicate a plurality of virtual viewpoints, based on performance of a plurality of rendering modules. Then, based on the plurality of pieces of virtual viewpoint information after being converted, contents of rendering that should be executed are allocated to at least part of the plurality of rendering modules. Then, a virtual viewpoint image adapted to the predetermined image format is generated by using results of rendering processing by the at least part of the rendering modules.

16 Claims, 17 Drawing Sheets

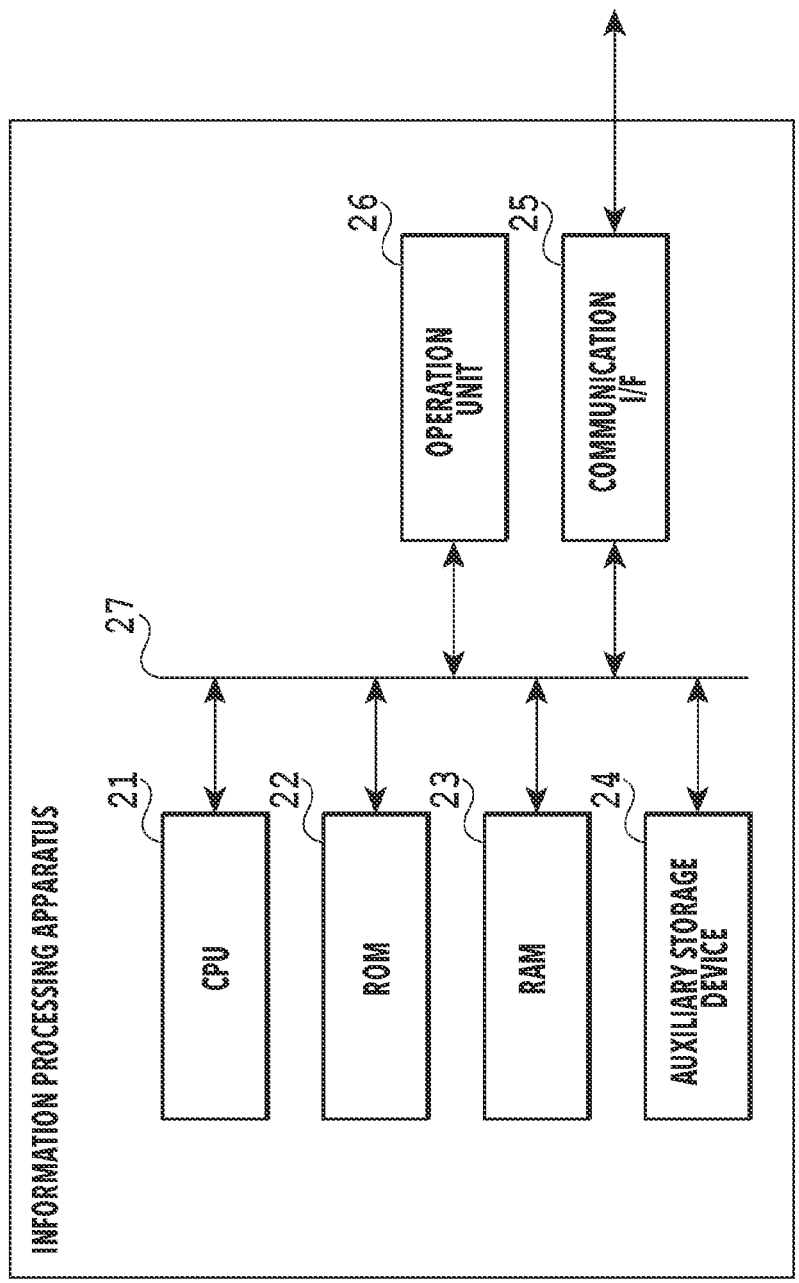

| Item | Time | Position | Orientation | Focal length | Viewing angle | | |
|---|---|---|---|---|---|---|---|
| explanation | hour, minute, second, frame | (x,y,z) | (v_x,v_y,v_z) | L(pix) | origin offset | width・height(w,h) | |
| virtual viewpoint_1 | 12:34:00:00 | (x1,y1,z1) | (v_x1,v_y1,v_z1) | 100pix | (-960,-540) | (1920,1080) | |
| virtual viewpoint_2 | 12:34:00:01 | (x2,y2,z2) | (v_x2,v_y2,v_z2) | 100pix | (-960,-540) | (1920,1080) | |

BEFORE CONVERSION

AFTER CONVERSION

IMAGE GENERATION SYSTEM, METHOD FOR GENERATING A VIRTUAL VIEWPOINT IMAGE, AND STORAGE MEDIUM

BACKGROUND

Field

The present disclosure relates to a technique to generate a virtual viewpoint image.

Description of the Related Art

In recent years, a technique has been attracting attention that generates image contents (virtual viewpoint image) viewed from an arbitrary virtual viewpoint by installing a plurality of cameras (imaging devices) at different points to perform synchronous image capturing at multiple viewpoints and by using a multi-viewpoint image obtained by the image capturing. With the above-described virtual viewpoint image, for example, it is possible to view a highlight scene in soccer or basketball from a variety of angles, and therefore it is possible to give a high feeling of being at a live performance to a user compared to a normal image.

The above-described virtual viewpoint image is obtained by aggregating captured multi-viewpoint images in an image processing apparatus, such as a server, and by performing processing, such as three-dimensional model generation and rendering, in the image processing apparatus. Then, by distributing the obtained virtual viewpoint image to an image display device, such as a mobile terminal, a user can browse the virtual viewpoint image. Here, in the generation stage, by creating in advance the image material, such as a three-dimensional model of an object, it is possible to obtain virtual viewpoint images in a variety of image formats in accordance with the needs of a user, for example, such as a virtual viewpoint image corresponding to 4K quality and a virtual viewpoint image corresponding to 8K quality. Consequently, it is required for an image processing system that generates a virtual viewpoint image to be capable of flexibly dealing with a variety of image formats.

In this regard, Japanese Patent Laid-Open No. 2014-215828 has described a technique to generate a plurality of virtual viewpoint images in accordance with virtual viewpoints designated by each of a plurality of users and share them among the plurality of users. Japanese Patent Laid-Open No. 2014-215828 has disclosed a technique capable of projecting an image in any format by changing the projection method for each projector in the image projection technique using a plurality of projectors.

In a case where virtual viewpoint images in a plurality of different image formats are generated, on a condition that rendering is performed by using a dedicated renderer for each image format, the configuration of the entire system becomes complicated and the cost accompanying the design of dedicated hardware and software also becomes high.

Consequently, an object of the technique of the present disclosure is to make it possible to efficiently generate virtual viewpoint images in different image formats.

SUMMARY

The image generation system according to the present disclosure: convert, based on performance of a plurality of rendering modules, virtual viewpoint information indicating a virtual viewpoint, for generating a virtual viewpoint image adapted to a predetermined image format, into a plurality of pieces of virtual viewpoint information which indicate a plurality of virtual viewpoints; allocate rendering processing that should be executed to at least part of the plurality of rendering modules based on the converted plurality of pieces of virtual viewpoint information; and generate a virtual viewpoint image adapted to the predetermined image format by using results of rendering processing by the at least part of the rendering modules.

Further features of the present disclosure will become apparent from the following description of exemplary embodiments with reference to the attached drawings.

BRIEF DESCRIPTION OF THE DRAWINGS

FIG. 1B is a diagram showing a hardware configuration of an image processing server;

16B is a diagram showing an example (excerpt) of virtual viewpoint information after conversion, according to a fourth embodiment.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

In the present embodiment, an aspect is explained in which rendering processing of a virtual viewpoint image is shared by a plurality of renderers in accordance with the resolution thereof (System Configuration)

Figure 1A:
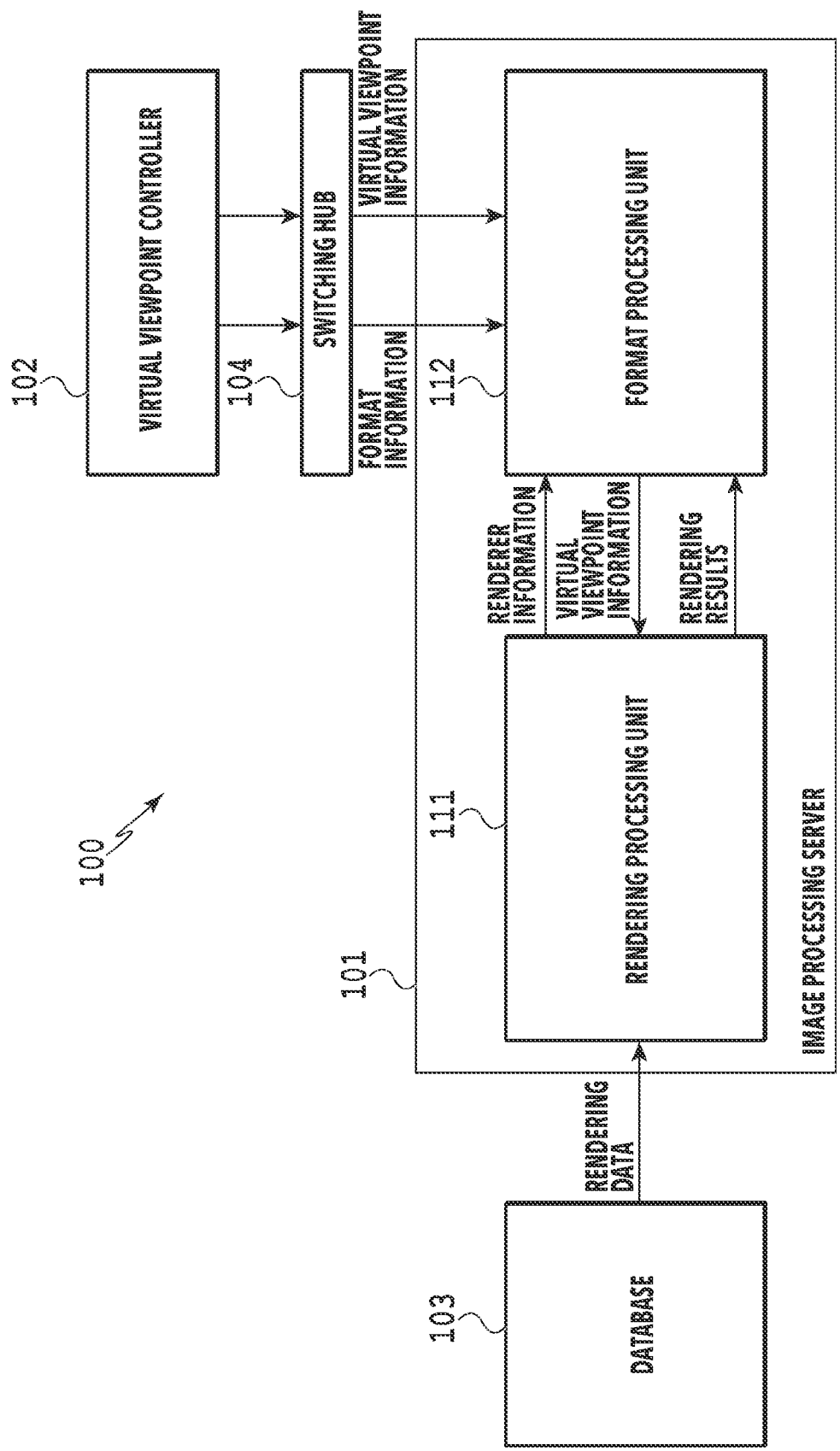
FIG. 1A is a diagram showing an example of a configuration of an image generation system.

FIG. 1A is a diagram showing an example of the configuration of an image generation system that generates a virtual viewpoint image. An image generation system 100 includes an image processing server 101, a virtual viewpoint controller 102, a database 103, and a switching hub 104.

The image processing server 101 has a rendering processing unit 111 and a format processing unit 112. The rendering processing unit 1 acquires data necessary for rendering, such as a three-dimensional model of an object and texture information, and performs rendering in accordance with virtual viewpoint information provided by the format processing unit 112. The data for rendering (in the following, called "rendering data"), such as a three-dimensional model and texture information, is acquired from the database 103. The format processing unit 112 converts the virtual viewpoint information that is input from the virtual viewpoint controller 102 so that a plurality of renderers can process the virtual viewpoint information and provides it to the rendering processing unit 111. Further, the format processing unit 112 performs processing to adapt the rendering results (provisional virtual viewpoint images) by the rendering processing unit 111 to the output image format and outputs as the final virtual viewpoint image. The rendering processing unit 111 and the format processing unit 112 are connected by a high-speed communication interface and perform transmission and reception of the virtual viewpoint information and the rendering results. The configuration may be one in which the rendering processing unit 111 and the format processing unit 112 are configured as separate image processing apparatuses and both the apparatuses are connected by a high-speed network. The high-speed network at this time may be GbE (Gigabit Ethernet) or 10 GbE in conformity to the IEEE standard, which is Ethernet (registered trademark), or may be configured by a combination of the interconnect Infiniband, Industrial Ethernet and the like. Further, the high-speed network may be another type of network, not limited to those.

The virtual viewpoint controller 102 is a controller for a user to set a virtual viewpoint. A user inputs information necessary for generation of a virtual viewpoint image, such as the viewpoint position, orientation, focal length, and viewing angle (or selects them from those prepared in advance). Then, information (virtual viewpoint information) that defines virtual viewpoints continuous in terms of time in accordance with the contents that are input or selected by a user is sent to the image processing server 101 via the switching hub 104. Details of the virtual viewpoint information will be described later. In FIG. 1A, the only one virtual viewpoint controller 102 exists, but it may also be possible to provide a plurality of the virtual viewpoint controllers 102.

The database 103 is a storage server storing the above-described rendering data, which is the image material necessary for rendering. In response to a data acquisition request from the image processing server 101, the rendering data is provided.

(Configuration of Image Processing Server)

Next, the image processing server 101 as an information processing apparatus is explained in more detail. First, the hardware configuration of the image processing server 101 is explained by using FIG. 1B. The image processing server 101 has a CPU 21, a ROM 22, a RAM 23, an auxiliary storage device 24, a communication I/F 25, an operation unit 26, and a bus 27.

The CPU 21 controls the entire image processing server 101 by using programs and data stored in the ROM 22 and the RAM 23. It may also be possible to have one piece or a plurality of pieces of dedicated hardware different from the CPU 21 and the dedicated hardware may perform at least part of the processing performed by the CPU 21. As an example of dedicated hardware, mention is made of an ASIC (Application-Specific Integrated Circuit), an FPGA (Field Programmable Gate Array), and a DSP (Digital Signal Processor). The ROM 22 stores programs and the like that do not need to be changed. The RAM 23 temporarily stores programs and data provided by the auxiliary storage device 24, data provided from the outside via the communication I/F 25, and the like. The auxiliary storage device 24 includes, for example, an HDD, an SSD and the like, and stores a variety of kinds of data and programs, such as tables that are referred to in various kinds of processing and various application programs, in addition to input data, such as image data and voice data. The communication I/F 25 is used for communication with an external apparatus. For example, in a case of being wired-connected with an external apparatus, a communication cable is connected to the communication I/F 25 and in a case of having a function to communicate wirelessly with an external apparatus, the communication I/F 25 comprises an antenna. The operation unit 26 includes, for example, a keyboard, a mouse and the like, and inputs various instructions to the CPU 21 upon receipt of the operation by a user. The bus 27 connects each unit of those described above and transmits data and signals.

Figure 2:
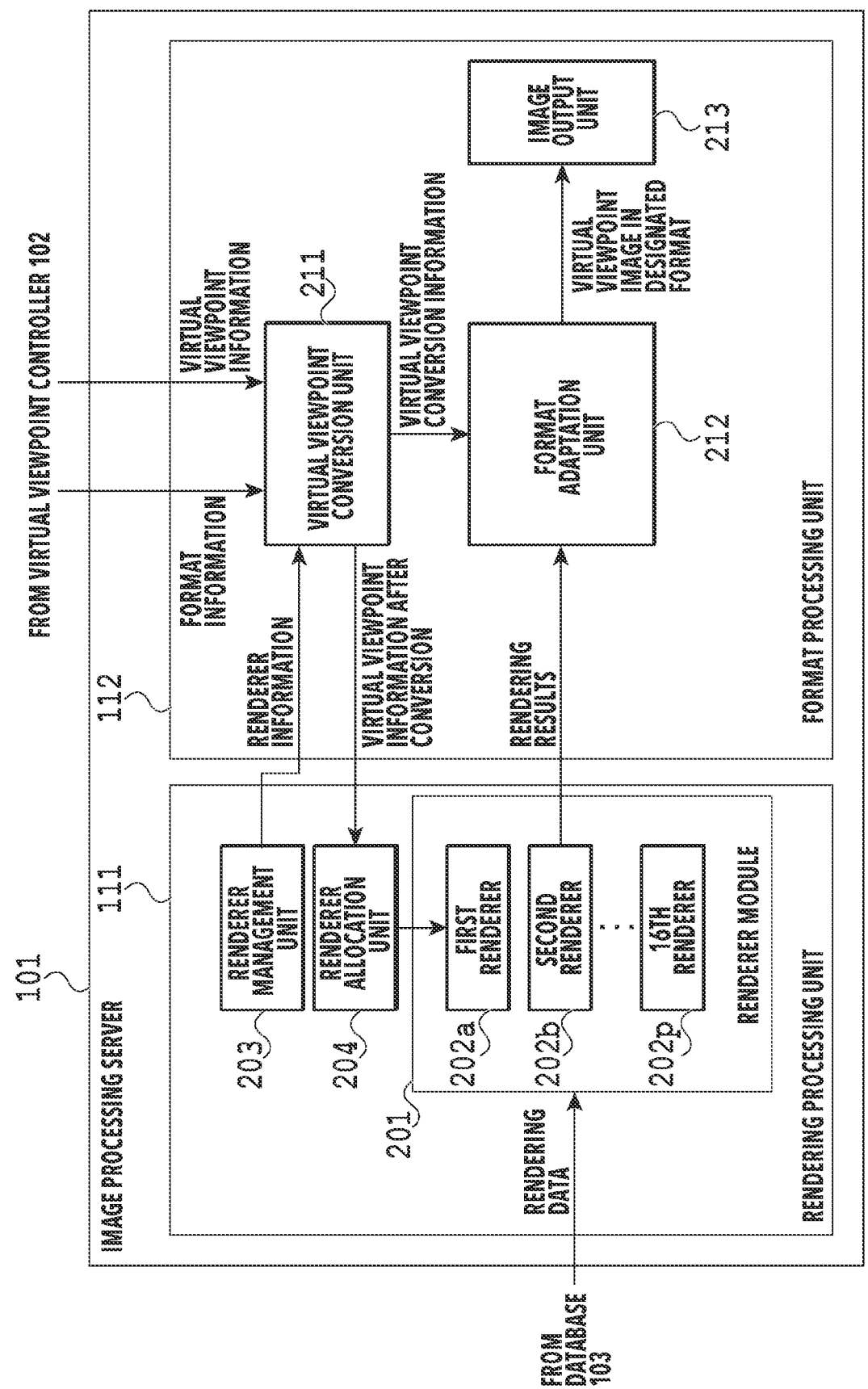
FIG. 2 is a function block diagram showing an internal configuration of an image processing server 101.

FIG. 2 is a function block diagram showing the internal configuration of the image processing server 101. As described previously, the image processing server 101 has the rendering processing unit 111 in charge of processing relating to rendering and the format processing unit 112 in charge of processing relating to the image format.

First, the internal configuration of the rendering processing unit 111 is explained. The rendering processing unit 111 has a renderer module 201, a renderer management unit 203, and a renderer allocation unit 204.

The renderer module 201 has a plurality of renderers 202, which is a basic processing unit for a rendering processing, and each renderer 202 generates a rendering image in accordance with virtual viewpoint information after being converted, to be described later, for each frame. It is assumed that the renderer module 201 of the present embodiment comprises 16 renderers from a first renderer to a 16th renderer. However, the number of renderers 202 possessed by the rendering processing unit 111 is not limited to 16 of the present embodiment. Each renderer 202 generates an image representing an appearance of a three-dimensional model from an arbitrary viewpoint designated by a user by performing rendering processing allocated to the renderer 202 itself by the renderer allocation unit 204, to be described later, as well as performing predetermined computing processing. The renderer 202 is implemented by software that runs on a computing element, such as the CPU 21, or hardware, such as a DSP and an ASIC. In FIG. 2, in order to identify each renderer 202, the renderer 202 is indicated with a subscript alphabet letter being attached, such as a first renderer 202a, a second renderer 202b, . . . , and a 16th renderer 202p. In the following explanation, for the contents that apply in common to the first renderer 202a to the 16th renderer 202p, there is a case where they are represented simply as "renderer 202".

The renderer management unit 203 stores and manages information (in the following, described as "renderer information") relating to the plurality of the renderers 202 possessed by the renderer module 201. Here, in the renderer information, information on the number of renderers 202 (16 in the present embodiment) mounted on the renderer module 201 and the performance of each renderer 202 is included. Then, in the information relating to the performance, information on the image resolution and the frame rate with which drawing is possible is included. In the present embodiment, it is assumed that each of the first renderer 202a to the 16th renderer 202p has the ability to perform generation with an image resolution of so-called 2K quality (1,920 pixels×1,080 pixels) and a frame rate of 60 fps. As the specific component of the renderer management unit 203, mention is made of a nonvolatile memory and the like and the renderer management unit 203 stores renderer information created in advance based on the specifications of the renderer module 201 as information inherent to the renderer module 201.

The renderer allocation unit 204 allocates rendering contents (drawing-target image area, frame and the like) to each of the renderers 202a to 202p within the renderer module 201, which each renderer 202 is in charge of based on the converted virtual viewpoint information provided by the virtual viewpoint conversion unit 211, to be described later. In a case where allocation is determined, the information thereon is delivered to the renderer module 201 and each renderer 202 performs rendering of the rendering contents allocated to itself.

Next, the internal configuration of the format processing unit 112 is explained. The format processing unit 112 has a virtual viewpoint conversion unit 211, a format adaptation unit 212, and an image output unit 213.

The virtual viewpoint conversion unit 211 determines a conversion scheme in accordance with the configuration of the renderer module 201 and performs conversion for the virtual viewpoint information that is input from the virtual viewpoint controller 102. The determination of a conversion scheme is performed based on information (in the following, described as "format information") relating to the image format, which is input separately from the virtual viewpoint controller 102, and the renderer information stored in the renderer management unit 203. It is assumed that in the format information of the present embodiment, at least the image resolution and the frame rate in a general 2D scheme are defined. The virtual viewpoint conversion unit 211 notifies the format adaptation unit 212 of the contents of the determined conversion scheme along with the format information (called all together "virtual viewpoint conversion information"). Details of the determination of a conversion scheme and the conversion processing of virtual viewpoint information in accordance with the determined conversion scheme will be described later. The converted virtual viewpoint information is sent to the above-described rendering processing unit 111.

The format adaptation unit 212 generates a virtual viewpoint image that adapts to a predetermined image format specified by the format information within the virtual viewpoint conversion information by using the rendering results received from the rendering processing unit 111. Details of the processing to generate a virtual viewpoint image that adapts to a predetermined image format from the rendering results (in the present embodiment, 16 rendering images at the maximum) in the renderer module 201 will be described later. The data of the generated virtual viewpoint image is delivered to the image output unit 213.

The image output unit 213 outputs the data of the virtual viewpoint image in accordance with a predetermined image format, which is provided from the format adaptation unit 212, to a user viewing terminal (not shown schematically) and the like. As the image data output interface, it is possible to make use of a publicly known communication interface, such as HDMI (registered trademark) (High Definition Multimedia Interface) and SDI (Serial Digital Interface). Further, it may also be possible to make use of an image output interface via a network, such as VoIP (Video over IP).

(Flow of Virtual Viewpoint Image Generation Processing)

Figure 3:
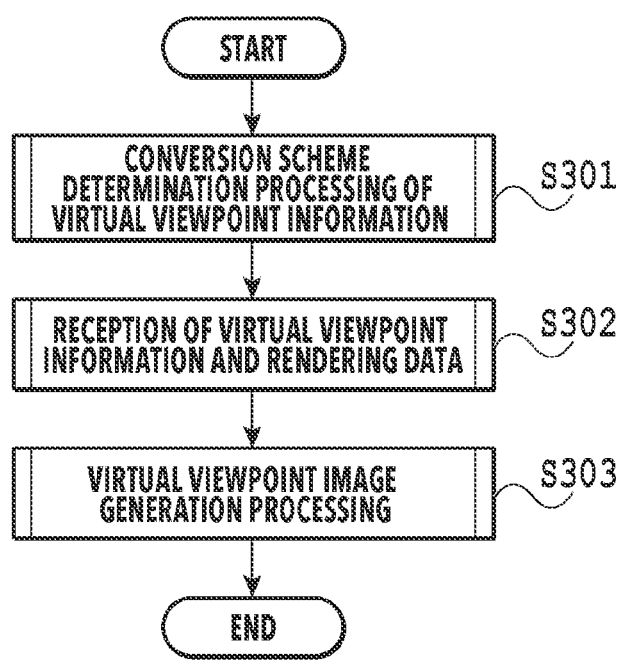
FIG. 3 is a flowchart showing a flow of entire processing to generate a virtual viewpoint image according to a first embodiment.

Next, a general flow of processing to generate a virtual viewpoint image in the image processing server 101 is explained. FIG. 3 is a flowchart showing a general flow of processing to generate a virtual viewpoint image by performing rendering after appropriately converting input virtual viewpoint information in accordance with the configuration of the renderer module 201 according to the present embodiment. The series of processing shown in the flowchart in FIG. 3 is implemented by the CPU 21 within the image processing server 101 loading a predetermined program onto the RAM 23 as a work memory and executing the program. Sign "S" that appears in explanation of the flowcharts including FIG. 3 represents a step.

First, at S301, a conversion scheme for the virtual viewpoint information that is input from the virtual viewpoint controller 102 is determined. This processing to determine a conversion scheme is preparatory processing (preprocessing) that is performed in the virtual viewpoint conversion unit 211 within the format processing unit 112 prior to execution of the rendering processing.

Next, at S302, the virtual viewpoint information in conformity to a predetermined image format specified by the format information is received from the virtual viewpoint controller 102 and the rendering data that is the material of a virtual viewpoint image is received from the database 103, respectively. The input virtual viewpoint information is input to the virtual viewpoint conversion unit 211 and the input rendering data is input to the renderer module 201.

Then, at S303, based on the input virtual viewpoint information and the input rendering data, generation processing of a virtual viewpoint image is performed. In this virtual viewpoint image generation processing, first, processing to convert the virtual viewpoint information is performed in accordance with the conversion scheme determined at S301. Then, rendering processing in accordance with the converted virtual viewpoint information and processing to generate a virtual viewpoint image adapted to a predetermined image format from the rendering results are performed in order. Details of the virtual viewpoint image generation processing will be described later.

The above is the general processing flow.

(Conversion Scheme Determination Processing of Virtual Viewpoint Information)

Figure 4:
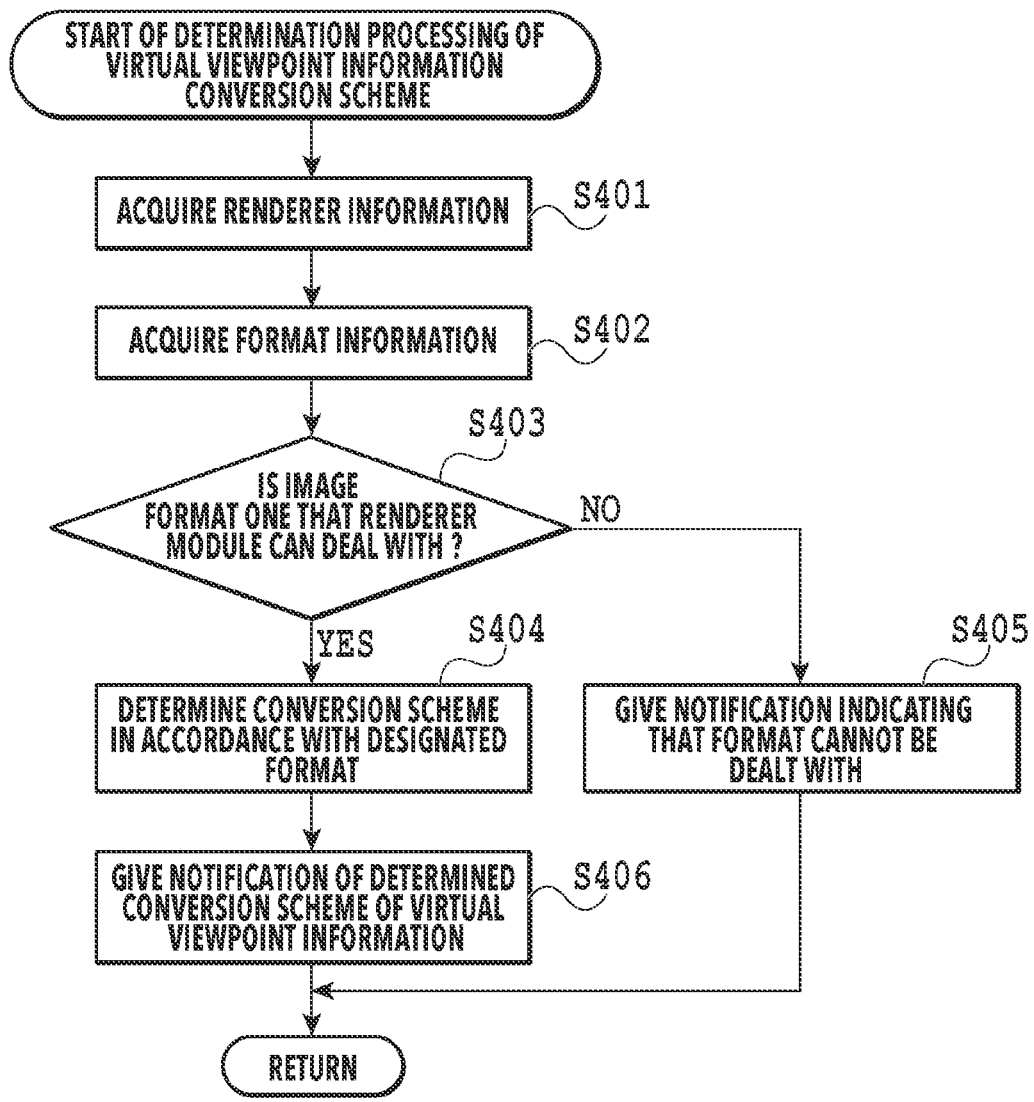
FIG. 4 is a flowchart showing a flow of conversion scheme determination processing of virtual viewpoint information.

Following the above, details of the conversion scheme determination processing of virtual viewpoint information (S301) as preprocessing are explained with reference to a flowchart shown in FIG. 4.

Figures 5A, 5B:
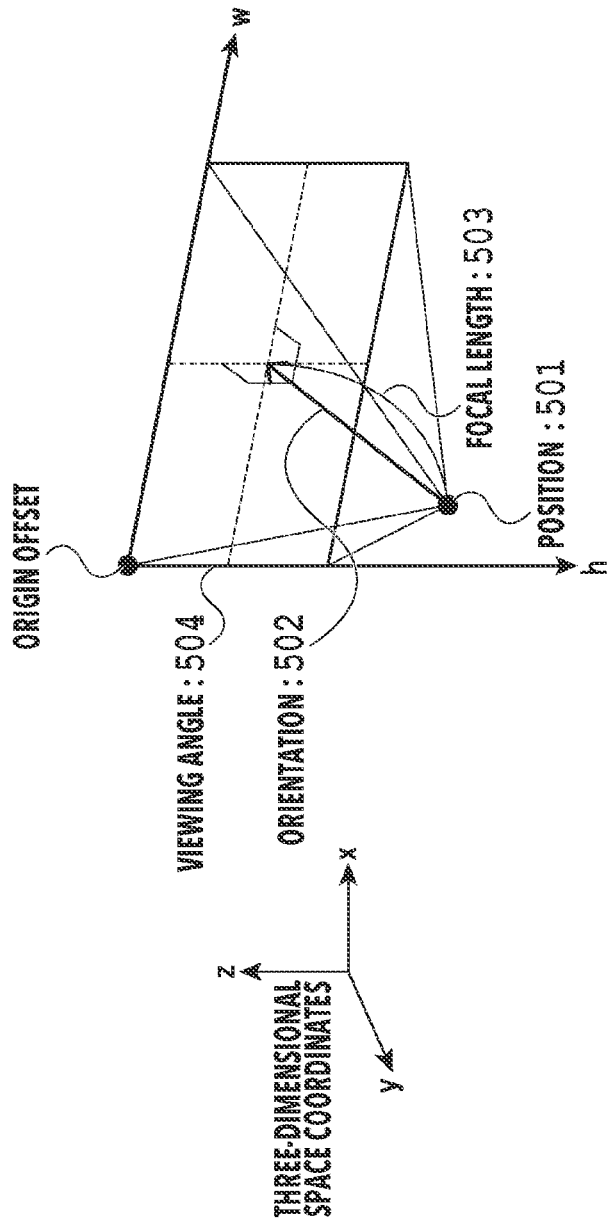
FIG. 5A is a diagram explaining a concept of a virtual viewpoint and FIG. 5B is a diagram showing an example of virtual viewpoint information.

Before starting explanation of the conversion scheme determination processing, the virtual viewpoint information is reviewed. FIG. 5A is a diagram explaining the concept of virtual viewpoint and FIG. 5B is a diagram showing an example of virtual viewpoint information for generating a virtual viewpoint image in conformity to the image format of 8K quality. A virtual viewpoint is specified by five elements, that is, a position 501, an orientation 502, a focal length 503, and a viewing angle 504, to which time is added. The position 501 is coordinate information indicating a virtual viewpoint position on a three-dimensional space. The orientation 502 is information indicating an orientation (line-of-sight direction) from the position 501 and represented by a three-dimensional vector. The focal length 503 corresponds to the distance from the position 501 to a virtual viewpoint image plane. The viewing angle 504 is information defining a range in which an object is captured in a virtual viewpoint image to be generated and specified by an origin offset, a width, and a height. Here, the origin offset is information indicating the origin (for example, point in the top-left corner) of a virtual viewpoint image to be generated on the virtual viewpoint image plane. Specifically, the origin offset is coordinate information indicating a difference between the position of an intersection point at which a perpendicular from the position 501 to the virtual viewpoint image plane intersects with the virtual viewpoint image plane and the position of the origin of a virtual viewpoint image to be generated. As in FIG. 5B, in the present embodiment, the focal length and the viewing angle are represented in units of pixels. Time is information indicating the time that is the target of generation of a virtual viewpoint image of the times at which multi-viewpoint images are captured, which are the source of generation, and specified by hour, minute, second, and a frame number. In the following, explanation of the flow in FIG. 4 is given on the assumption that virtual viewpoint information for generating a virtual viewpoint image in conformity to the image format whose image resolution is so-called 8K quality (7,680 pixels×4,320 pixels) and whose frame rate is 60 fps is input from the virtual viewpoint controller 102.

First, at S401, the above-described renderer information is acquired from the renderer management unit 203 of the rendering processing unit 111. At S402 that follows, the format information that specifies the image format of a generation-target virtual viewpoint image is acquired from the virtual viewpoint controller 102 via the switching hub 104.

Figure 6A:
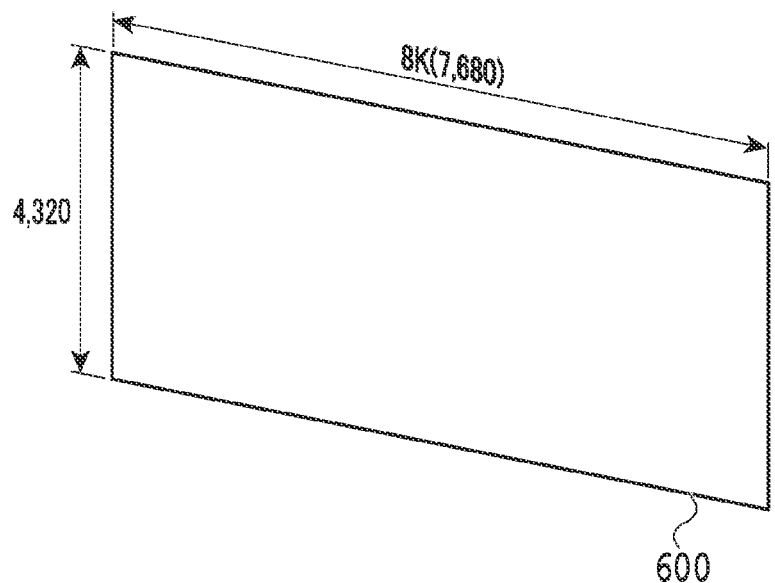
FIG. 6A is a diagram showing a drawing area of 8K quality and FIG. 6B is a diagram showing a drawing area of 8K quality that can be processed by each renderer.
Figure 6B:
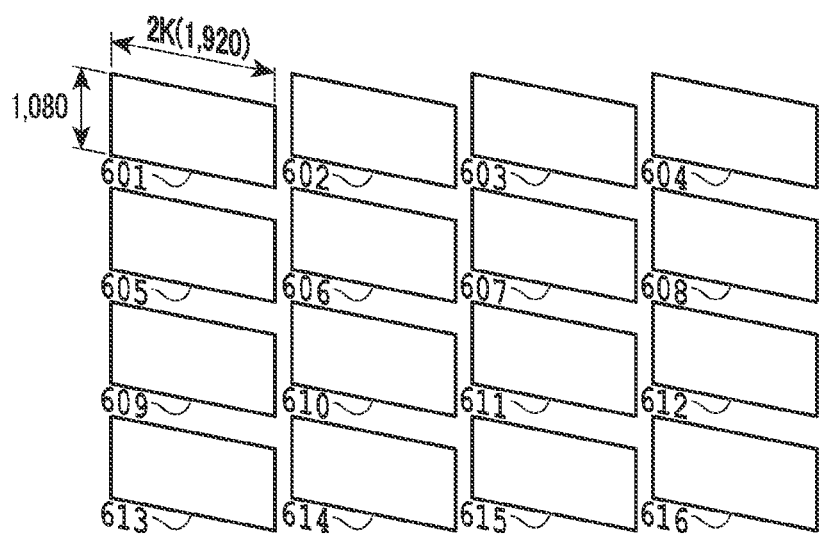

Then, at S403, whether the image format (in the following, called "designated format") designated by a user, which is indicated by the format information, is the image format that the configuration of the renderer module 201 indicated by the renderer information can deal with is determined. As described previously, each renderer 202 configuring the renderer module 201 of the present embodiment has the ability to perform rendering with a 2K resolution. Here, with reference to FIG. 6A and FIG. 6B, the determination of whether or not it is possible for the renderer module 201 to deal with the designated format is explained. A horizontally-elongated rectangle 600 shown in FIG. 6A shows a drawing area of 8K quality to which the virtual viewpoint information that is input from the virtual viewpoint controller 102 is in conformity. Then, each of 16 horizontally-elongated rectangles 601 to 616 shown in FIG. 6B indicates a drawing area of 2K quality that each renderer 202 can process. In a case of the present embodiment, it is not possible for the renderer 202 alone to generate a virtual viewpoint image in accordance with the image format of 8K quality. However, as shown in FIG. 6B, by performing generation of 16 virtual viewpoint images in the unit of 2K quality (that is, by performing rendering by the 16 renderers 202 in a sharing manner) and combining the 16 obtained rendering images, it is possible to obtain a virtual viewpoint image of 8K quality. As described above, in the present embodiment, in a case where the virtual viewpoint information that is input from the virtual viewpoint controller 102 is in conformity to the image format of 8K quality, it is determined that the virtual viewpoint controller 102 can dealt therewith. Further, similarly, in a case where the virtual viewpoint information that is input from the virtual viewpoint controller 102 is in conformity to the image format of so-called 4K quality (3,840 pixels×2,160 pixels), it is also possible to perform rendering by the four renderers 202 in a sharing manner, and therefore, it is determined that the renderer module 201 can deal therewith. In a case where the results of the determination processing such as this indicate that the designated format is an image format that can be dealt with, the processing advances to S404 and in a case where the designated format is an image format that cannot be dealt with, the processing advances to S405.

Figure 7A:
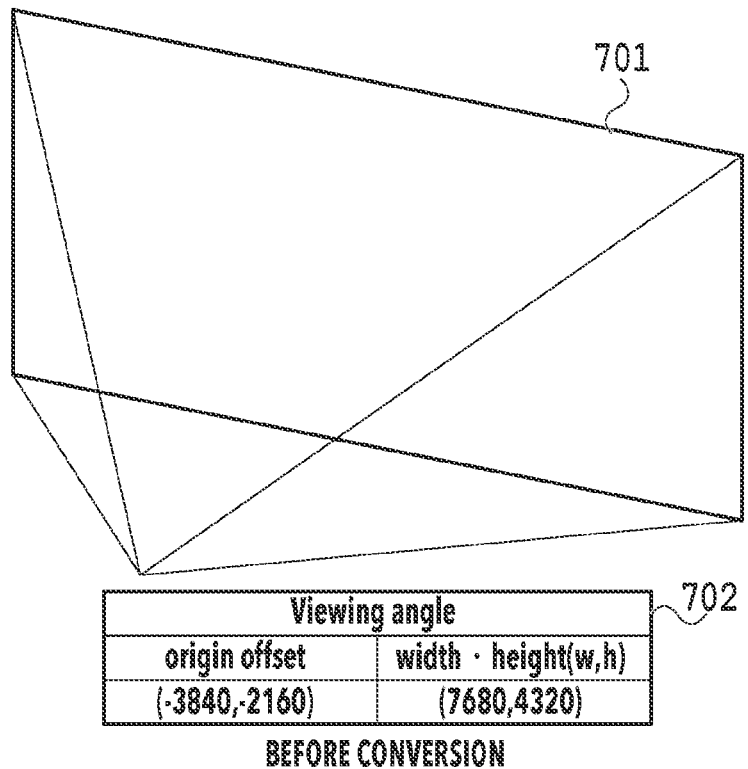
FIG. 7A is a diagram showing an example (excerpt) of virtual viewpoint information before conversion and FIG. 7B is a diagram showing an example (excerpt) of virtual viewpoint information after conversion according to the first embodiment.
Figure 7B:
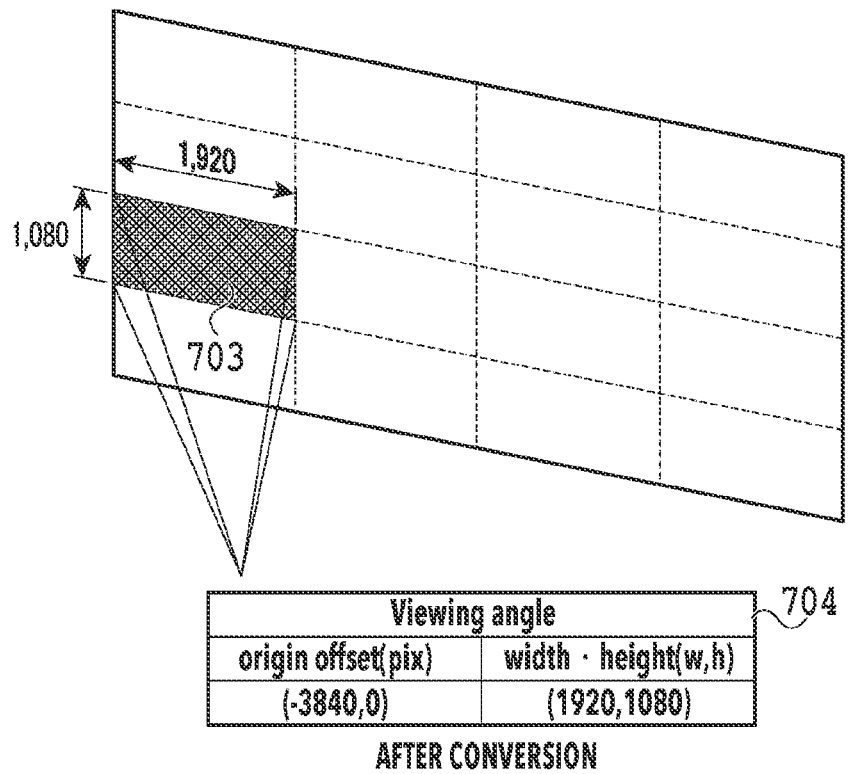

At S404, a conversion scheme for the virtual viewpoint information that is input from the virtual viewpoint controller 102 is determined, which is in conformity to the image format of a generation-target virtual viewpoint image. In a case where each renderer 202 has the ability to perform rendering with 2K quality, on a condition that virtual viewpoint information for 8K quality is input, as shown in FIG. 7A and FIG. 7B, it is determined to divide it into 16 pieces of virtual viewpoint information for 2K quality. FIG. 7A is a diagram explaining virtual viewpoint information for 8K quality that is input from the virtual viewpoint controller 102 and a drawing area of 8K quality 701 and viewing angle information 702 thereon are shown. FIG. 7B is a diagram explaining virtual viewpoint information for 2K quality after being converted based on the configuration of the renderer module 201 and a unit drawing area 703 after being converted and viewing angle information 704 thereon are shown. As obvious from a comparison between FIG. 7A and FIG. 7B, in a case of this example, the viewing angle information changes. Among the items of the viewing angle information, the items (time, position, orientation, focal length) not described in FIG. 7A or FIG. 7B are omitted because they do not change from those before the conversion.

At S405, a notification to the effect that the designated format is an image format that cannot be dealt with is transmitted to the virtual viewpoint controller 102.

Lastly, at S406, the format adaptation unit 212 is notified of the virtual viewpoint conversion information indicating the contents of the conversion scheme determined at S404 and the determination processing of the virtual viewpoint conversion scheme is terminated.

(Virtual Viewpoint Image Generation Processing)

Figure 8:
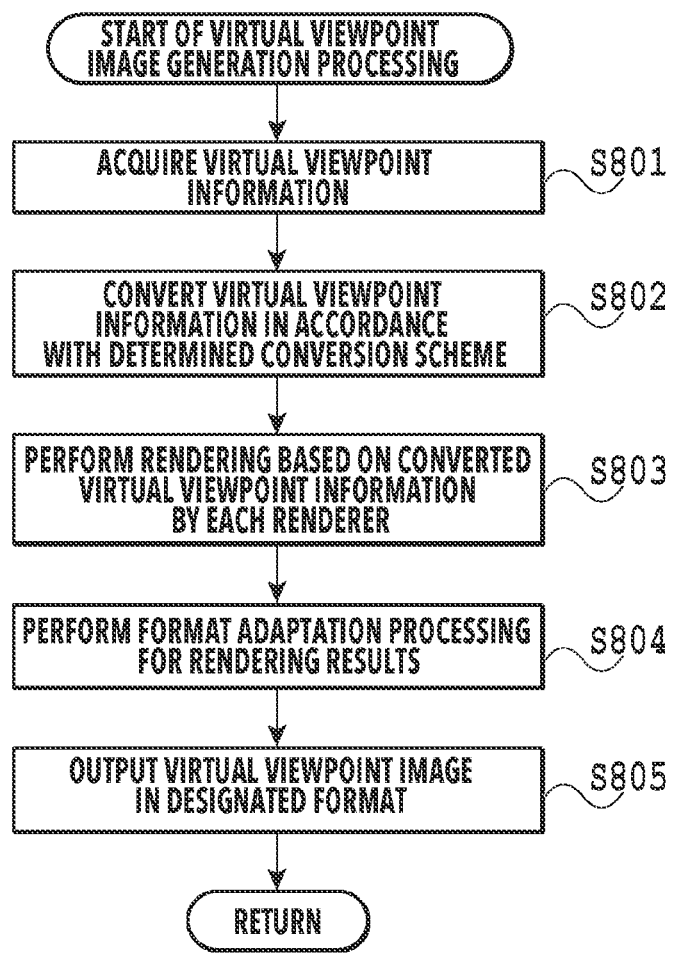
FIG. 8 is a flowchart showing a flow of virtual viewpoint image generation processing.

Next, details of the virtual viewpoint image generation processing (S303) are explained with reference to a flowchart shown in FIG. 8. The series of processing shown in FIG. 8 is performed in the unit of frame. Here also, explanation is given on the assumption that virtual viewpoint information in conformity to the image format of 8K quality is input from the virtual viewpoint controller 102.

First, at S801, the virtual viewpoint information received from the virtual viewpoint controller 102 is input to the format processing unit 112. At S802 that follows, in the virtual viewpoint conversion unit 211, the virtual viewpoint information that is input at S801 is converted in accordance with the conversion scheme determined in the preprocessing. The converted virtual viewpoint information is sent to the rendering processing unit 111.

Figure 9:
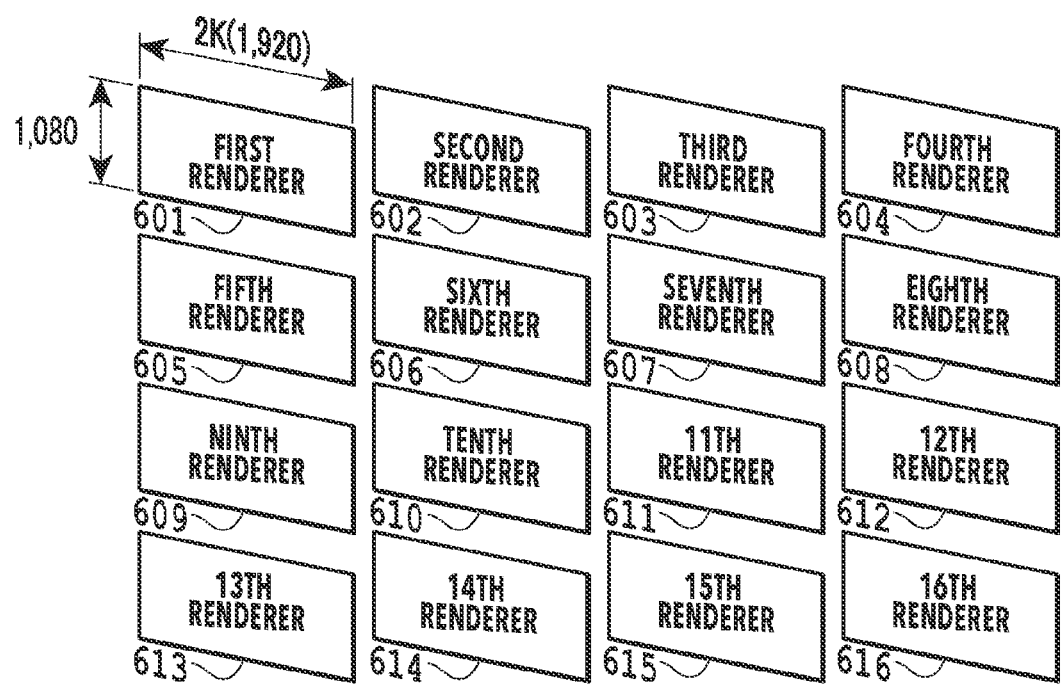
FIG. 9 is a diagram showing an example of results of allocation to each renderer.

At S803, in the rendering processing unit 111, rendering processing based on the converted virtual viewpoint information is performed. Specifically, first, the renderer allocation unit 204 allocates the drawing area that is in the charge of each of the renderers 202a to 202p within the renderer module 201 based on the converted virtual viewpoint information received from the virtual viewpoint conversion unit 211. FIG. 9 shows an example of results of the allocation to each of the renderers 202a to 202p. Here, the allocation is performed so that the drawing area of 2K 601 is allocated to the first renderer 202a, the drawing area of 2K 602 is allocated to the second renderer 202b, ..., and the drawing area of 2K 616 is allocated to the 16th renderer 202p. Each of the 16 renderers 202a to 202p performs rendering of the drawing area that is in the charge of itself by using the rendering data provided from the database 103 in accordance with the converted virtual viewpoint information divided into 16 pieces. Rendering results (16 rendering images) by the 16 renderers 202a to 202p are sent to the format processing unit 112.

At S804, in the format processing unit 112, the processing to generate a virtual viewpoint image that adapts to the designated format is performed by using the rendering results. In a case of the present embodiment, in the format adaptation unit 212, a virtual viewpoint image of 8K quality, which is the designated format, is generated by combining the 16 virtual viewpoint images of 2K quality received from the renderer module 201. Data of the generated virtual viewpoint image is delivered to the image output unit 213.

At S805, the image output unit 213 outputs the virtual viewpoint image data in the designated format generated at S804.

The above is the contents of the virtual viewpoint image generation processing.

As described previously, it is possible to provide a plurality of the virtual viewpoint controllers 102. A case is explained as a modification example where a plurality of pieces of virtual viewpoint information in conformity to each of different image formats is sent from a plurality of virtual viewpoint controllers.

Modification Example 1

Figure 10:
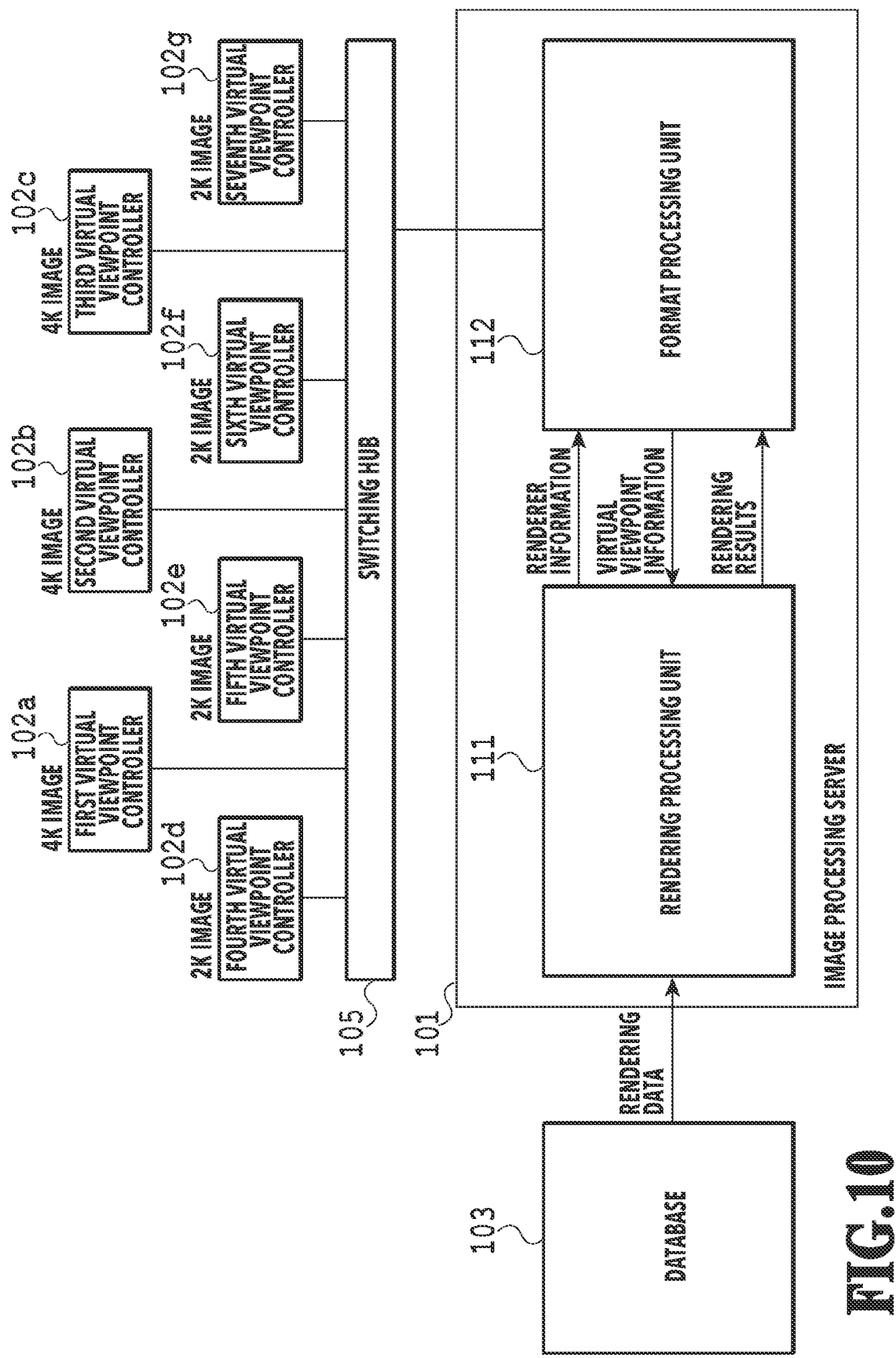
FIG. 10 is a diagram showing an example of a configuration of an image generation system according to a modification example 1 of the first embodiment.

FIG. 10 is a diagram showing an example of the configuration of an image generation system comprising a plurality of virtual viewpoint controllers according to the present modification example. An image generation system 100' of the present modification example comprises a total of seven virtual viewpoint controllers, that is a first virtual viewpoint controller 102a to a seventh virtual viewpoint controller 102g. Then, the first virtual viewpoint controller 102a to the third virtual viewpoint controller 102c are virtual viewpoint controllers for setting a virtual viewpoint in conformity to the image format of 4K quality. Then, the remaining virtual viewpoint controllers, that is, the fourth virtual viewpoint controller 102d to the seventh virtual viewpoint controller 102g are virtual viewpoint controllers for setting a virtual viewpoint in conformity to the image format of 2K quality. Although omitted in FIG. 10, each of these seven virtual viewpoint controllers 102a to 102g transmits virtual viewpoint information and format information to the image processing server 101 via the switching hub 104. The system configuration is the same as that of the image generation system 100 in FIG. 1 except that virtual viewpoint information and format information are input from each of the plurality of virtual viewpoint controllers.

Figure 11A:
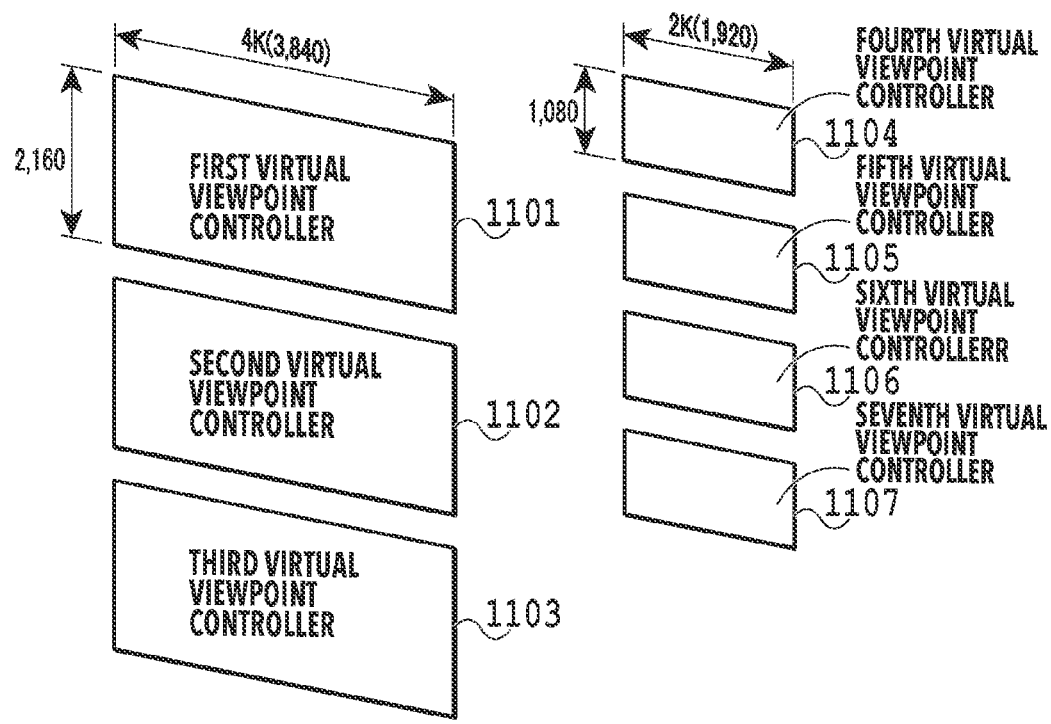
FIG. 11A and FIG. 11B are each a diagram explaining allocation of virtual viewpoint information to each renderer according to the modification example 1 of the first embodiment.
Figure 11B:
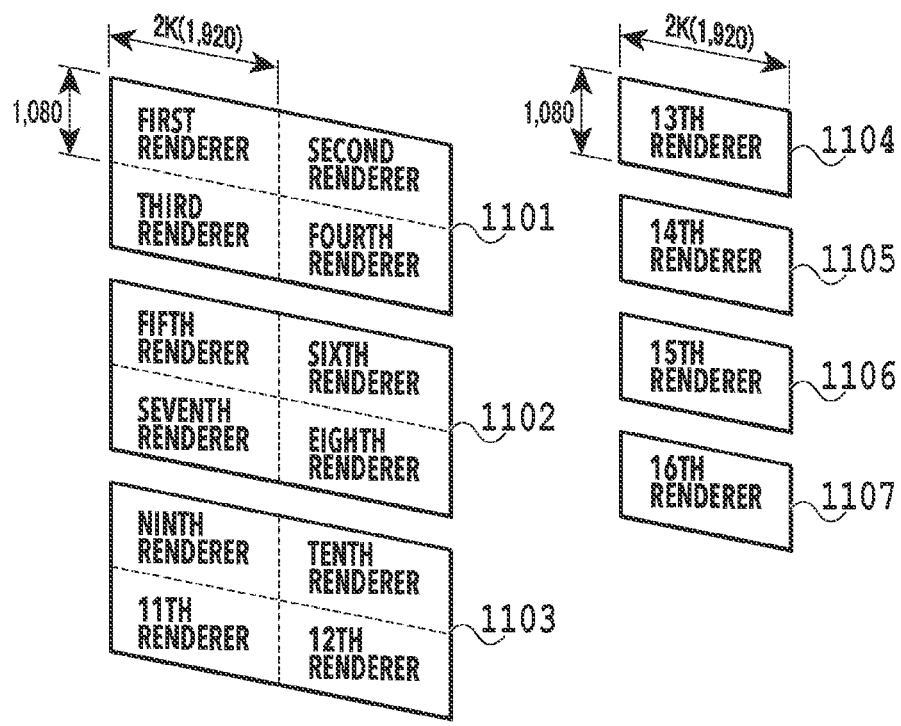

FIG. 11A and FIG. 11B are diagrams corresponding to FIG. 6A and FIG. 6B described previously, respectively, and showing allocation of the converted virtual viewpoint information to each of the 16 renderers 202a to 202p in the present modification example. In FIG. 11A, three horizontally elongated rectangles 1101 to 1103 each indicate the drawing area of 4K quality, which is the premise of the virtual viewpoint information that is input from each of the first virtual viewpoint controller 102a to the third virtual viewpoint controller 102c. Further, in FIG. 11A, four horizontally elongated rectangles 1104 to 1107 each indicate the drawing area of 2K quality, which is the premise of the virtual viewpoint information that is input from each of the fourth virtual viewpoint controller 102d to the seventh virtual viewpoint controller 102g. Then, FIG. 11B shows drawing areas that are allocated to the 16 renderers 202a to 202p. In a case of the present modification example, it is not possible for the renderer 202 alone to generate a virtual viewpoint image in accordance with the image format of 4K quality. However, as shown in FIG. 11B, by performing rendering with 2K quality by each of the four renderers 202 in a sharing manner and combining the four obtained rendering images, it is possible to obtain a virtual viewpoint image of 4K quality. For example, for the virtual viewpoint information that is input from the first virtual viewpoint controller 102a, by dividing and converting the virtual viewpoint information into four pieces of virtual viewpoint information and by the first renderer 202a to the fourth renderer 202d performing rendering in a sharing manner, it is possible to obtain a virtual viewpoint image of 4K quality. This is also the same with the virtual viewpoint information that is input from the second virtual viewpoint controller 102b and the third virtual viewpoint controller 102c. That is, also for the virtual viewpoint information that is input from the second virtual viewpoint controller 102b, by dividing and converting the virtual viewpoint information into four pieces of virtual viewpoint information and by the fifth renderer 202e to the eighth render 202h performing rendering in a sharing manner, it is possible to obtain a virtual viewpoint image of 4K quality. Further, also for the virtual viewpoint information that is input from the third virtual viewpoint controller 102c, by dividing and converting the virtual viewpoint information into four pieces of virtual viewpoint information and by the ninth renderer 202i to the 12th render 202l performing rendering in a sharing manner, it is possible to obtain a virtual viewpoint image of 4K quality. On the other hand, the virtual viewpoint information that is input from the fourth virtual viewpoint controller 102d to the seventh virtual viewpoint controller 102g premises 2K quality the same as the unit processing ability of the renderer 202. Consequently, by allocating the rendering in accordance with the input virtual viewpoint information as it is to each of the 13th renderer 202m to the 16th render 202p and by each renderer performing rendering that is in the charge of itself, it is possible to generate a virtual viewpoint image of 2K quality.

Modification Example 2

Next, a case is explained where virtual viewpoint information in conformity to the image format whose image resolution exceeds the unit processing ability of each render 202 but whose frame rate is less than the unit processing ability of each renderer 202 is input from each of two virtual viewpoint controllers. Here, a case is supposed where virtual viewpoint information in conformity to the image format whose image resolution is 8K and whose frame rate is 30 fps is input from the separate virtual viewpoint controllers 102. Here, the processing ability of each of the 16 renderers 202 is such that the image resolution is 2K and the frame rate is 60 fps. That is, in a case where the frame rate is taken as a reference, each render 202 has double the processing ability. Consequently, by the 16 renderers 202a to 202p collaborating, it is possible to obtain two virtual viewpoint images of 8K quality 8 L and 30 fps with the same rendering load as that of 8K quality and 60 fps. For example, the virtual viewpoint information from one of the virtual viewpoint controllers 102 is divided into 16 pieces of virtual viewpoint information in conformity to 2K quality and then the converted virtual viewpoint information is allocated so that the one renderer 202 is in charge of rendering corresponding to the two unit drawing areas (see FIG. 6B described previously). In this state, the first renderer 202a to the eighth renderer 202h are caused to process one of the two pieces of virtual viewpoint information in a sharing manner and in parallel to this, the ninth renderer 202i to the 16th renderer 202p are caused to process the other piece of virtual viewpoint information in a sharing manner. By doing so, it is made possible to generate two kinds of virtual viewpoint image in accordance with the image format of 8K quality and 30 fps both simultaneously and in parallel.

As described above, even in a case where the virtual viewpoint information in accordance with different image formats is input separately from a plurality of virtual viewpoint controllers, by allocating rendering in accordance with the unit processing ability of the renderer 202, it is made possible to obtain a desired virtual viewpoint image. In the modification example described above, explanation is given on the premise that a plurality of the virtual viewpoint controllers 102 is in operation at the same time, but this is not limited. For example, it may be considered that the virtual viewpoint controller 102 is added newly during the operation of the already-existing image generation system. In this case also, on a condition that one of the renderers 202 is not used and new allocation is possible, it may also be possible to start generation of a virtual viewpoint image in accordance with the virtual viewpoint information that is input from the new virtual viewpoint controller 102 even while another virtual viewpoint controller 102 is in operation.

As above, according to the present embodiment, virtual viewpoint information in conformity to the image format of high resolution is divided into pieces of virtual viewpoint information in conformity to the image format of low resolution and rendering is performed by a plurality of renderers in a sharing manner. Due to this, it is made possible to efficiently generate virtual viewpoint images in accordance with the image formats of various resolutions in a short time and at a low cost.

Second Embodiment

In the first embodiment, the aspect is explained in which attention is focused on the image resolution among the performance of each renderer 202 and rendering is shared by a plurality of the renderers 202 in accordance with the image resolution. Next, an aspect is explained as a second embodiment in which attention is focused on the frame rate among the performance of each renderer 202 and rendering is shared by a plurality of the renderers 202 in accordance with the frame rate. The basic system configuration and the rough flow of the virtual viewpoint image generation are in common to those of the first embodiment, and therefore, in the following, different points from the first embodiment are explained mainly.

Figure 12:
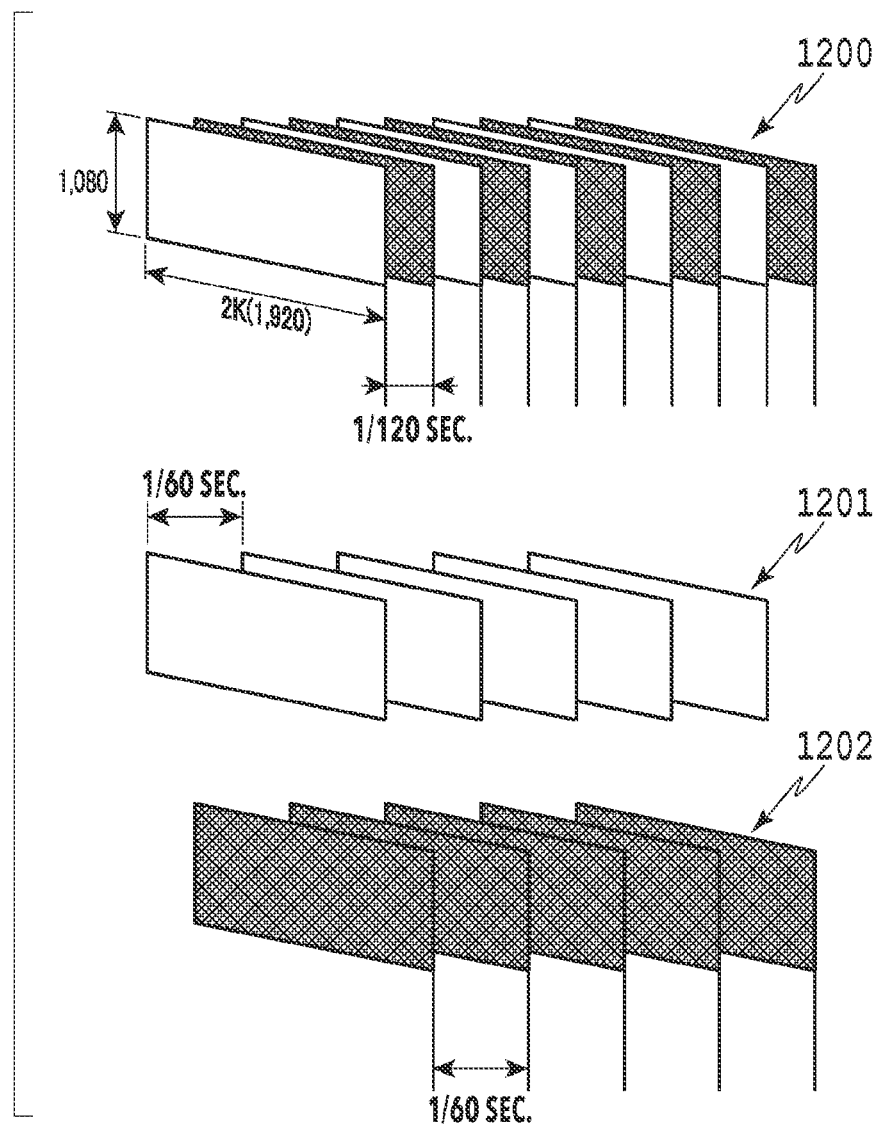
FIG. 12 is a diagram schematically showing conversion of virtual viewpoint information according to a second embodiment.

FIG. 12 is diagram schematically showing conversion of virtual viewpoint information in the present embodiment. In FIG. 12, a frame group 1200 indicates frame intervals in a case where the frame rate is 120 fps. Here, it is assumed that the format information that is input from the virtual viewpoint controller 102 specifies that the resolution is 2K quality and the frame rate is 120 fps.

As described previously, the rendering ability of each renderer 202 of the renderer module 201 shown in the function block diagram in FIG. 2 is that the resolution is 2K quality and the frame rate is 60 fps. Consequently, by sharing rendering by the two renderers 20, a virtual viewpoint image corresponding to a frame rate of 120 fps is generated. That is, at S404 in the flow in FIG. 4 described previously, in the unit of 60 fps that each renderer 202 can deal with, the virtual viewpoint information that premises 120 fps, which is input from the virtual viewpoint controller 102, is divided into two pieces and rendering is shared. In the example in FIG. 12, the input virtual viewpoint information is divided so that rendering of a group 1201 of even-numbered frames among the input frame group 1200 is performed by the first renderer 202a and rendering of a group 1202 of the remaining odd-numbered frames is performed by the second renderer 202b.

Figure 13:
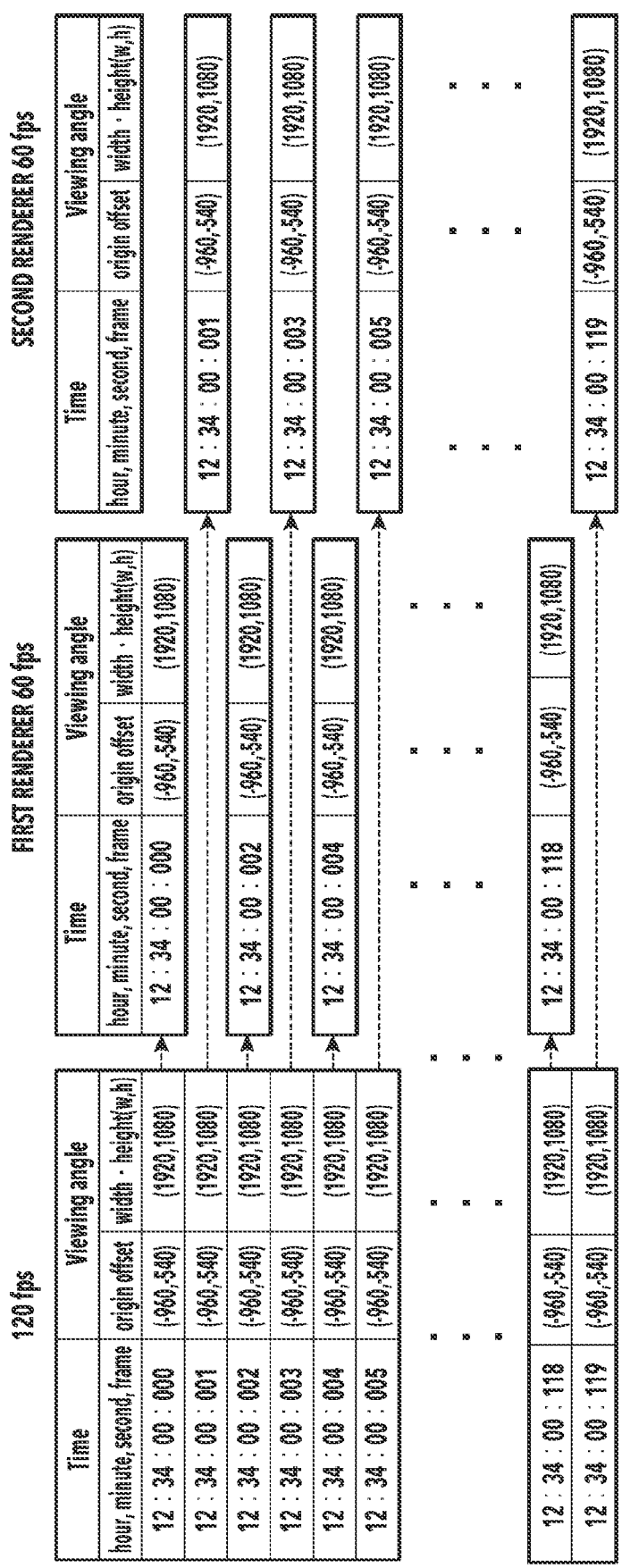
FIG. 13 is a diagram showing an example of conversion of virtual viewpoint information according to the second embodiment.

FIG. 13 is a diagram explaining conversion of virtual viewpoint information in the present embodiment. In FIG. 13, a "120 fps" table shows virtual viewpoint information corresponding to one second before conversion, which is input from the virtual viewpoint controller 102b, and a "first renderer 60 fps" table and a "second renderer 60 fps" table show the virtual viewpoint information conversion. As shown in FIG. 13, each frame is allocated in order so that rendering of the group 1201 of frames whose frame number is even is performed by the first renderer 202a and rendering of the group 1202 of frames whose frame number is odd is performed by the second renderers 202b. Due to this, it is possible to obtain a rendering image corresponding to 60 fps from each renderer 202. Then, by performing processing to arrange both the rendering images in order for each frame in the format adaptation unit 212, it is possible to generate a virtual viewpoint image of 120 fps.

Modification Example

In the present embodiment, the aspect is explained in which the case is supposed where virtual viewpoint information in conformity to the frame rate exceeding the performance of each renderer 202 is input and the rendering-target frame is shared in the unit of processing ability of the renderer 202, but there is a case where a frame rate less than the performance is required. For example, a case where a virtual viewpoint image of a frame rate, such as 50 fps adopted in Europe and the like and 24 fps adopted in a movie, is generated. In a case where a frame rate less than the unit processing ability of each renderer 202 is required as described above, it is sufficient to perform rendering in accordance with input virtual viewpoint information by thinning a predetermined number of frames in any of the renderer 202.

As above, according to the present embodiment, the virtual viewpoint information that premises a virtual viewpoint image whose frame rate exceeds the performance of each renderer is divided into the frame rate in the unit that the renderer can process and rendering is performed. Due to this, it is made possible to efficiently generate virtual viewpoint images in accordance with image formats of a variety of frame rates in a short time and at a low cost.

Third Embodiment

Next, an aspect is explained as a third embodiment in which a viewing angle is caused to have a surplus area at the time of conversion of virtual viewpoint information based on an image resolution explained in the first embodiment. In the following explanation, it is assumed that the basic configuration of the image generation system is the same as that of the first embodiment. However, it is assumed that each renderer 202 of the present embodiment has the rendering ability corresponding to the resolution of 2,048 pixels×1,200 pixels whose numbers of pixels in the vertical and horizontal directions are larger than those of 2K quality. Then, as in the case of the first embodiment, explanation is given on the assumption that format information indicating that the resolution is 8K quality and virtual viewpoint information that premises 8K quality are input from the virtual viewpoint controller 102.

Figure 14A:
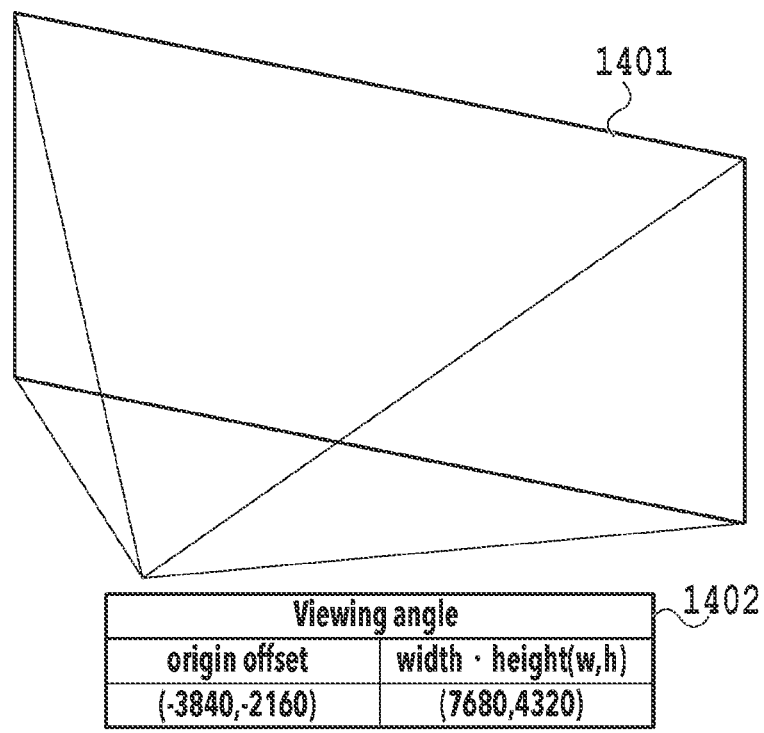
FIG. 14A is a diagram showing an example (excerpt) of virtual viewpoint information before conversion and FIG. 14B is a diagram showing an example (excerpt) of virtual viewpoint information after conversion, according to a third embodiment.
Figure 14B:
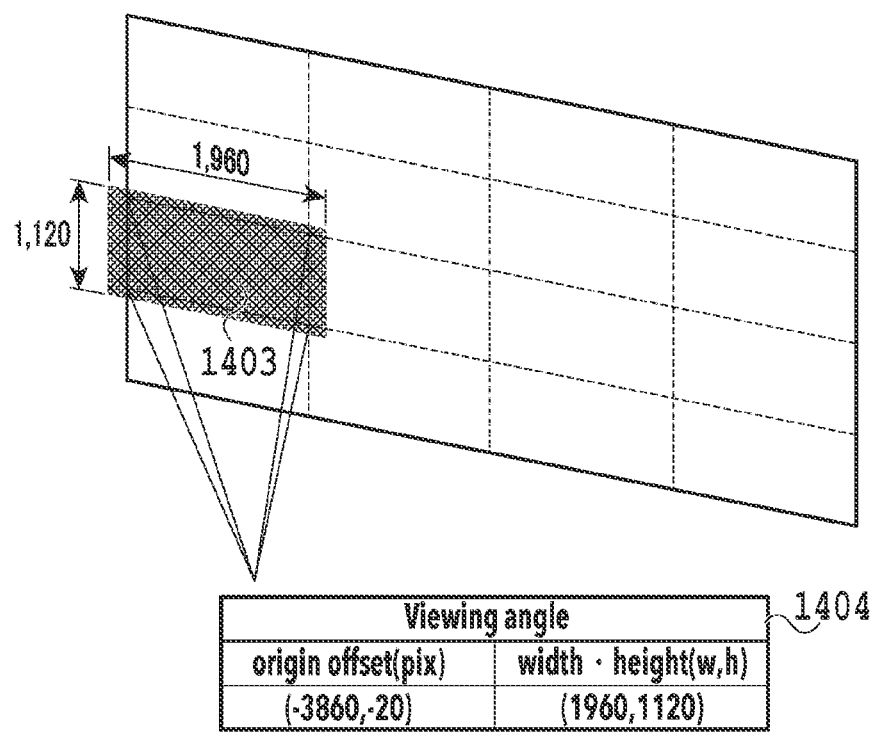

FIG. 14A and FIG. 14B are diagrams corresponding to FIG. 7A and FIG. 7B of the first embodiment, respectively. FIG. 14A is a diagram explaining virtual viewpoint information that is input from the virtual viewpoint controller 102 and viewing angle information 1402 corresponding to a drawing area of 8K quality 1401 is shown. FIG. 14B is a diagram explaining virtual viewpoint information after being converted in accordance with the performance of each renderer 202 configuring the renderer module 201 and viewing angle information 1404 corresponding to a unit drawing area 1403 after conversion is shown. As in the case of the first embodiment, the viewing angle information changes, but from a comparison with the viewing angle information 704 in FIG. 7B, it is known that there is an increase in the number of pixels by 20 pixels both in the vertical direction and in the horizontal direction in the viewing angle information 1404 in FIG. 14B. Here, the amount of increase is 20 pixels, but as long as within the range of the resolution performance of the renderer 202, it is sufficient to perform conversion of virtual viewpoint information by increasing the number of pixels in the surplus area.

Figure 15:
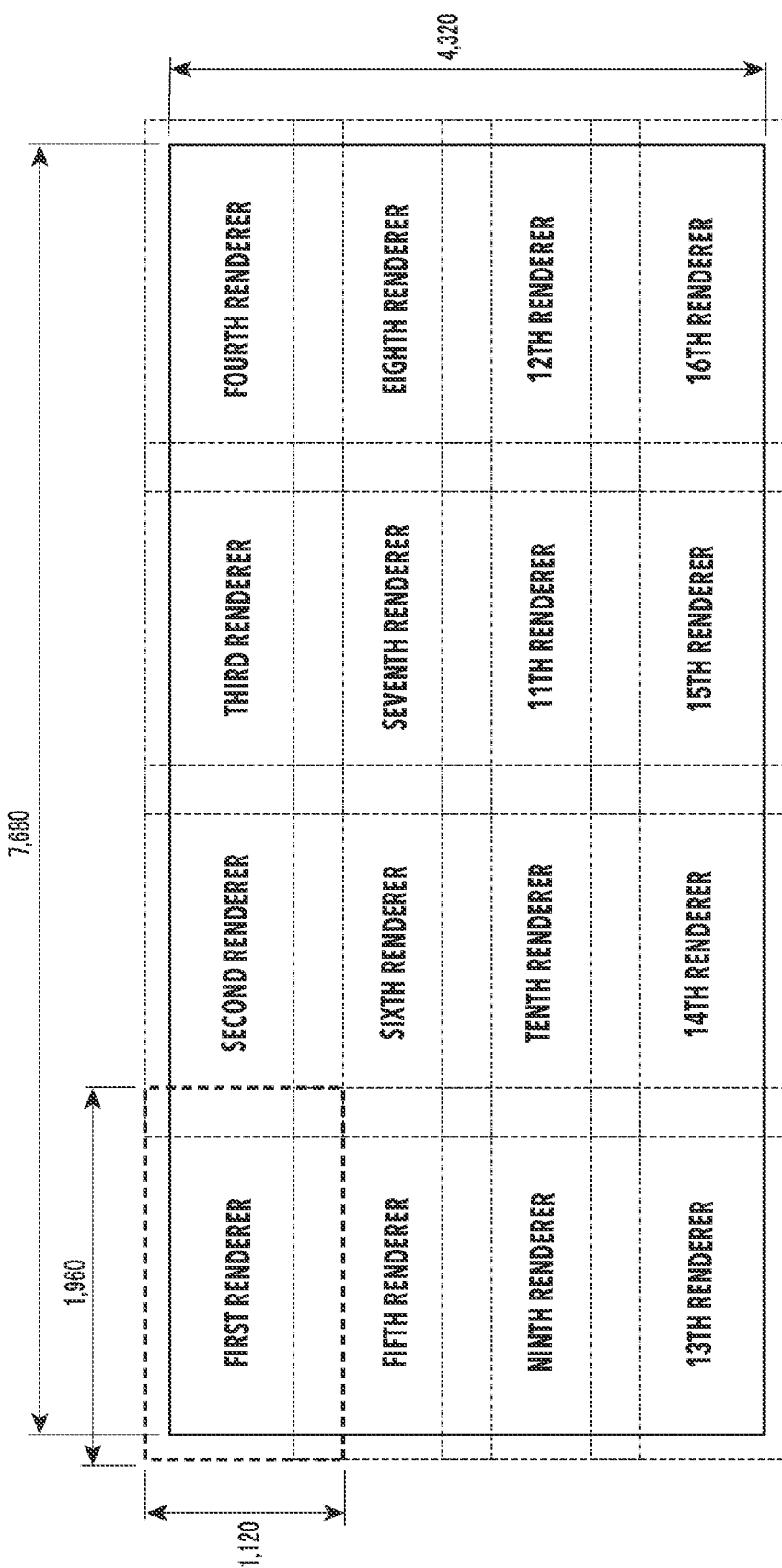
FIG. 15 is a diagram explaining processing at the time of adapting rendering results to a designated format according to the third embodiment.

FIG. 15 is a diagram explaining processing at the time of adapting the rendering results (16 rendering images) generated in accordance with the converted virtual viewpoint information shown in FIG. 14B to 8K quality, which is the designated format. In FIG. 15, the rectangle indicated by a broken line indicates the drawing area that is in the charge of each of the first renderer 202a to the 16th renderer 202p. As shown in FIG. 15, it is possible to obtain 8K quality finally by combining the images of 1,960 pixels×1,120 pixels generated by each of the renderers 202a to 202p with the surplus areas (here, 20 pixels both in the vertical direction and in the horizontal direction) being excluded, that is, with the amount corresponding to the surplus area being overlapped.

As above, according to the present embodiment, after overlapping the amount corresponding to the surplus area, rendering is performed in a sharing manner, and therefore, it is made possible to obtain a natural combined image in which discontinuity at the boundary between the drawing areas that are in the charge of each renderer is suppressed.

Fourth Embodiment

Following the above, an aspect is explained as a fourth embodiment in which at the time of dividing virtual viewpoint information that is input from the virtual viewpoint controller 102 based on the image resolution, the virtual viewpoint information is not divided equally to each renderer 202. In the following explanation, it is assumed that the basic configuration of the image generation system is the same as that of the first embodiment. That is, it is assumed that the image resolution for which each renderer 202 can perform rendering is the same as 1,920 pixels×1,080 pixels of the first embodiment. Then, in the present embodiment, it is assumed that virtual viewpoint information corresponding to the image format whose resolution is 4,096 pixels×2,160 pixels (that is, the number of pixels is larger both in the vertical direction and in the horizontal direction that that of 4K quality) is input from the virtual viewpoint controller 102.

Figure 16A:
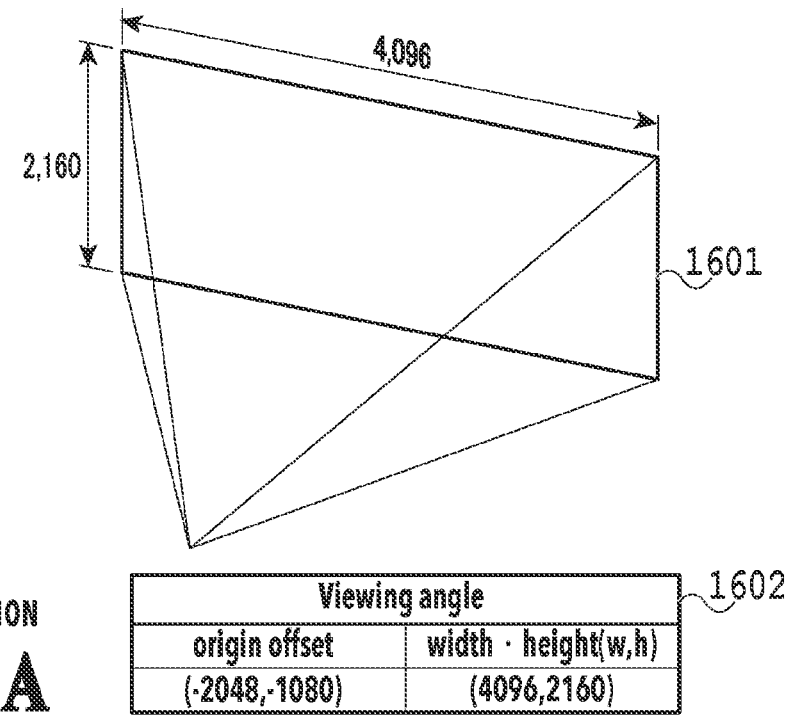
FIG. 16A is a diagram showing an example (excerpt) of virtual viewpoint information before conversion and FIG.
Figure 16B:
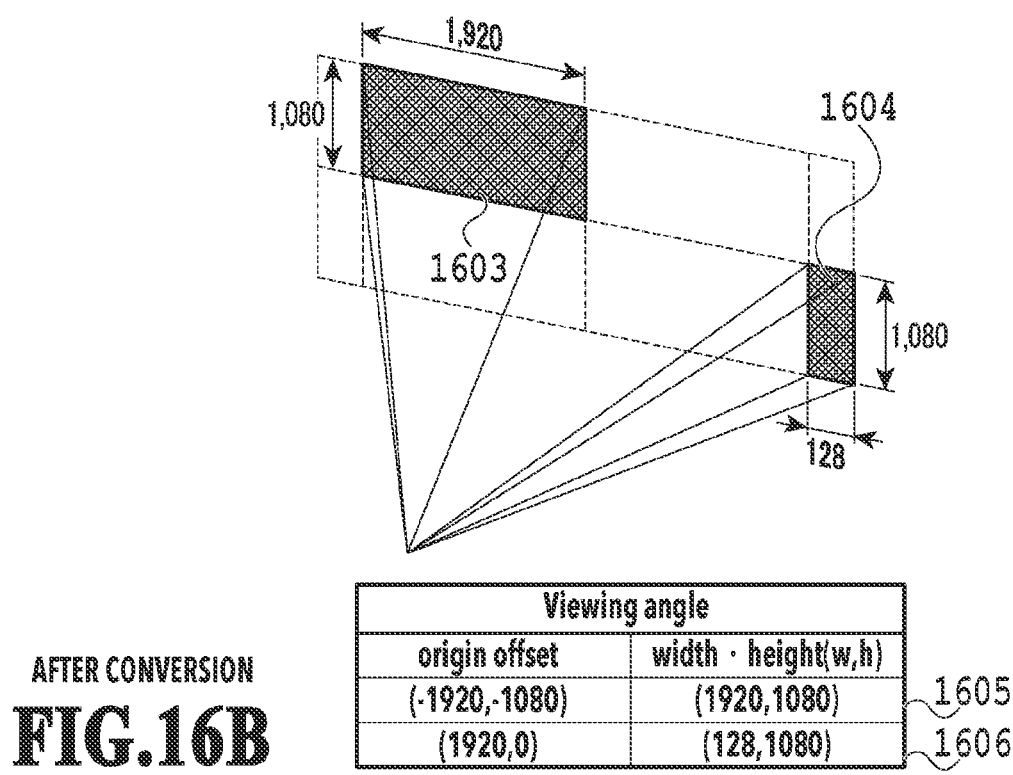

FIG. 16A and FIG. 16B are diagrams corresponding to FIG. 7A and FIG. 7B of the first embodiment, respectively. FIG. 16A is a diagram explaining virtual viewpoint information that is input from the virtual viewpoint controller 102 and viewing angle information 1602 corresponding to a drawing area 1601 whose image resolution is 4,096 pixels× 2,160 pixels is shown. FIG. 16B is a diagram explaining the virtual viewpoint information after being converted in accordance with the performance of each renderer 202 configuring the renderer module 201. In FIG. 16B, viewing angle information 1605 corresponding to a unit drawing area 1603 after the conversion (resolution: 1,920 pixels×1,080 pixels) and viewing angle information 1606 corresponding to a unit drawing area 1604 after the conversion (128 pixels×1,080 pixels) are shown. In a case where the virtual viewpoint information that is input premises the image format of 4,096 pixels×2,160 pixels, the width is not divided by 1,920 pixels. Because of this, part of the virtual viewpoint information including the viewing angle information on the remaining area (here, 128 pixels 1,080 pixels) less than the unit drawing area is allocated to the renderer 202. In detail, first, the virtual viewpoint information including viewing angle information of (w, h)=(4096, 2160) is divided into four pieces of virtual viewpoint information including viewing angle information of (w, h)=(1920, 1080) and two pieces of virtual viewpoint information including viewing angle of (w, h)=(128, 1080). Then, a total of six obtained pieces of virtual viewpoint information are allocated to the six renderers 202 and each renderer 202 performs rendering of the allocated virtual viewpoint information that is in the charge of each renderer 202. The ratio of division described here is an example, and it may also be possible to perform division in a ratio different from that described above.

As above, even in a case where it is not possible to divide and convert virtual viewpoint information in the unit of processing ability of each renderer, by performing division and conversion by changing the ratio as described above, it is possible to generate a virtual viewpoint image by causing a plurality of renderers to cooperate with one another.

OTHER EMBODIMENTS

In the first to fourth embodiments, with the fact in mind that the projection scheme is the general 2D scheme, the case is explained where virtual viewpoint images whose image resolution or frame rate is different are generated, but the embodiments are not limited to those. For example, it is also possible to apply the embodiments to a case where a 3D virtual viewpoint image is generated by converting virtual viewpoint information that premises the 2D scheme into virtual viewpoint information corresponding to a projection scheme other than the 2D scheme, for example, a 3D scheme that implements a stereoscopic view by using two images whose disparity is different. In this case, it may be possible to apply the method explained in the second embodiment. That is, it is possible to obtain two kinds of virtual viewpoint image necessary for a stereoscopic view by converting virtual viewpoint information so that the two renderers 202 are caused to be in charge of rendering for each of two kinds of images whose disparity is different in a sharing manner. Similarly, it is also possible to apply the embodiments to a case where it is desired to output in the panorama scheme in which it is possible to change the line-of-sight direction in the range of 360 degrees at the maximum or in the 3D panorama scheme in which a stereoscopic view is implemented by using two images obtained by the panorama scheme.

Further, in the first to fourth embodiments, explanation is given on the assumption that all the 16 renderers possessed by the renderer module 201 have the same performance, but the configuration of the renderer module 201 is not limited to this. For example, the renderer module 201 may be configured by a combination of renderers having the image resolution of 4K quality and renderers having the resolution of 2K quality. It is only required to be capable of generating a virtual viewpoint image in accordance with a predetermined image format that input from the virtual viewpoint controller 102 by a plurality of renderers included in the renderer module 201 performing rendering in cooperation with one another and combining or the like the rendering results thereof.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is made possible to efficiently generate virtual viewpoint images whose image format is different.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-037639, filed Mar. 5, 2020, which is hereby incorporated by reference wherein in its entirety.

What is claimed is:

1. An image generation system comprising:
one or more memories storing instructions; and
one or more processors executing the instructions to:
convert, based on performance of a plurality of rendering modules, virtual viewpoint information indicating a virtual viewpoint, for generating a virtual viewpoint image adapted to a predetermined image format, into a plurality of pieces of virtual viewpoint information which respectively indicate a plurality of virtual viewpoints;
allocate rendering processing that should be executed to at least part of the plurality of rendering modules based on the converted plurality of pieces of virtual viewpoint information; and
generate a virtual viewpoint image adapted to the predetermined image format by using results of rendering processing by the at least part of the rendering modules.

2. The image generation system according to claim 1, wherein
the one or more processors further execute the instructions to:
manage information relating to a number and the performance of the plurality of rendering modules; and
perform the conversion based on the managed information.

3. The image generation system according to claim 1, wherein
the conversion is performed for virtual viewpoint information in conformity to the predetermined image format, which is input from a controller for a user to input the virtual viewpoint information.

4. The image generation system according to claim 3, wherein
the conversion is performed for virtual viewpoint information in conformity to a first image format, which is input from a first controller for inputting virtual viewpoint information in conformity to the first image format, and for virtual viewpoint information in conformity to a second image format, which is input from a second controller for inputting virtual viewpoint information in conformity to the second image format different from the first image format.

5. The image generation system according to claim 1, wherein
the predetermined image format is defined by an image resolution in a 2D scheme and
virtual viewpoint information in conformity to the predetermined image format defined by the image resolution is converted into virtual viewpoint information with an image resolution that the plurality of rendering modules can deal with.

6. The image generation system according to claim 5, wherein
viewing angle information included in the virtual viewpoint information in conformity to the predetermined image format defined by the image resolution is equally divided in a unit of an image resolution that the plurality of rendering modules can deal with and converted into the plurality of pieces of virtual viewpoint information.

7. The image generation system according to claim 6, wherein
the equal division is performed by causing each piece of viewing angle information included in the plurality of pieces of virtual viewpoint information to have a surplus area and
a virtual viewpoint image that adapts to the predetermined image format is generated by performing processing to combine a plurality of virtual viewpoint images obtained by rendering based on the plurality of pieces of converted virtual viewpoint information with the surplus area being excluded.

8. The image generation system according to claim 6, wherein
in a case where viewing angle information included in the virtual viewpoint information in conformity to the predetermined image format defined by the image resolution cannot be divided equally in the unit of the image resolution that the plurality of rendering modules can deal with, the viewing angle information is converted into the plurality of pieces of virtual viewpoint information by changing a ratio.

9. The image generation system according to claim 5, wherein
the image resolution that the rendering module can deal with is lower than the image resolution defined in the predetermined image format.

10. The image generation system according to claim 1, wherein
the predetermined image format is defined by a frame rate in a 2D scheme and
virtual viewpoint information in conformity to the predetermined image format defined by the frame rate is converted into virtual viewpoint information with a frame rate that the plurality of rendering modules can deal with.

11. The image generation system according to claim 10, wherein
the virtual viewpoint information in conformity to the predetermined image format defined by the frame rate is allocated in order by one frame each time and converted into virtual viewpoint information with a frame rate that the plurality of rendering modules can deal with.

12. The image generation system according to claim 10, wherein
the frame rate that the plurality of rendering modules can deal with is lower than a frame rate defined in the predetermined image format.

13. The image generation system according to claim 1, wherein
the predetermined image format is defined by a projection scheme different from a 2D scheme and
virtual viewpoint information in conformity to the predetermined image format defined by a projection scheme different from the 2D scheme is converted into virtual viewpoint information with a projection scheme that the plurality of rendering modules can deal with.

14. The image generation system according to claim 13, wherein
the projection scheme different from the 2D scheme is one of a 3D scheme, a panorama scheme, and a 3D panorama scheme.

15. A method for generating a virtual viewpoint image in accordance with a predetermined image format, the method comprising:
converting, based on performance of a plurality of rendering modules, virtual viewpoint information indicating a virtual viewpoint, for generating a virtual viewpoint image adapted to the predetermined image format, into a plurality of pieces of virtual viewpoint information which indicate a plurality of virtual viewpoints;
allocating rendering processing that should be executed to at least part of the plurality of rendering modules based on the converted plurality of pieces of virtual viewpoint information; and
generating a virtual viewpoint image adapted to the predetermined image format by using results of rendering processing by the at least part of the rendering modules.

16. A non-transitory computer-readable storage medium storing a program for causing a computer to perform a method for generating a virtual viewpoint image in accordance with a predetermined image format, the method comprising:
converting based on performance of a plurality of rendering modules, virtual viewpoint information indicating a virtual viewpoint, for generating a virtual viewpoint image adapted to the predetermined image format, into a plurality of pieces of virtual viewpoint information which indicate a plurality of virtual viewpoints;
allocating rendering processing that should be executed to at least part of the plurality of rendering modules based on the converted plurality of pieces of virtual viewpoint information; and
generating a virtual viewpoint image adapted to the predetermined image format by using results of rendering processing by the at least part of the rendering modules.

* * * * *